(12) United States Patent
Luan et al.

(10) Patent No.: US 9,921,754 B2
(45) Date of Patent: Mar. 20, 2018

(54) DYNAMIC CODING ALGORITHM FOR INTELLIGENT CODED MEMORY SYSTEM

(71) Applicant: Futurewei Technologies, Inc., Plano, TX (US)

(72) Inventors: Hao Luan, Plano, TX (US); Alan Gatherer, Plano, TX (US); Sriram Vishwanath, Plano, TX (US); Casen Hunger, Plano, TX (US); Hardik Jain, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/811,357

(22) Filed: Jul. 28, 2015

(65) Prior Publication Data

US 2017/0031606 A1 Feb. 2, 2017

(51) Int. Cl.
*G06F 3/06* (2006.01)

(52) U.S. Cl.
CPC .......... *G06F 3/0611* (2013.01); *G06F 3/0653* (2013.01); *G06F 3/0673* (2013.01)

(58) Field of Classification Search
None
See application file for complete search history.

(56) References Cited

U.S. PATENT DOCUMENTS

| 5,586,296 | A | 12/1996 | Bernstein et al. |
|---|---|---|---|
| 6,341,342 | B1 | 1/2002 | Thompson et al. |
| 7,945,752 | B1 | 5/2011 | Miller et al. |
| 8,074,021 | B1 | 12/2011 | Miller et al. |
| 2003/0065884 | A1* | 4/2003 | Lu ............. G06F 12/0893 711/118 |
| 2007/0168700 | A1 | 7/2007 | Dickenson et al. |
| 2007/0168702 | A1 | 7/2007 | Dickenson et al. |
| 2008/0126682 | A1 | 5/2008 | Zhao et al. |
| 2009/0100236 | A1 | 4/2009 | Puig |
| 2009/0138670 | A1 | 5/2009 | Mutlu et al. |
| 2010/0023678 | A1 | 1/2010 | Nakanishi et al. |

(Continued)

FOREIGN PATENT DOCUMENTS

| CN | 101132336 A | 2/2008 |
|---|---|---|
| CN | 101196857 A | 6/2008 |

(Continued)

OTHER PUBLICATIONS

U.S. Appl. No. 14/811,763, filed Jul. 28, 2015.

(Continued)

*Primary Examiner* — Jared Rutz
*Assistant Examiner* — Stephanie Wu
(74) *Attorney, Agent, or Firm* — Zilka-Kotab, PC

(57) ABSTRACT

Systems and techniques for dynamic coding of memory regions are described. A described technique includes monitoring accesses to a group of memory regions, each region including two or more portions of a group of data banks; detecting a high-access memory region based on whether accesses to a region of the group of memory regions exceeds a threshold; generating coding values of a coding region corresponding to the high-access memory region, the high-access memory region including data values distributed across the group of banks; and storing the coding values of the coding region in a coding bank.

25 Claims, 7 Drawing Sheets

(56) References Cited

U.S. PATENT DOCUMENTS

| | | | |
|---|---|---|---|
| 2011/0022791 A1* | 1/2011 | Iyer | G06F 12/08 711/105 |
| 2011/0167192 A1* | 7/2011 | Iyer | G06F 12/06 711/5 |
| 2011/0179200 A1 | 7/2011 | Sukonik et al. | |
| 2011/0179240 A1 | 7/2011 | Sukonik et al. | |
| 2011/0238941 A1 | 9/2011 | Xu et al. | |
| 2012/0127818 A1 | 5/2012 | Levy et al. | |
| 2012/0297118 A1* | 11/2012 | Gorobets | G06F 3/0611 711/103 |
| 2013/0279280 A1* | 10/2013 | Franzon | G11C 29/04 365/200 |
| 2013/0339821 A1* | 12/2013 | Cordero | G06F 11/1666 714/773 |
| 2014/0047197 A1 | 2/2014 | Kokrady et al. | |
| 2014/0059301 A1* | 2/2014 | Rao | G06F 11/1012 711/150 |
| 2014/0173180 A1 | 6/2014 | D'Abreu et al. | |
| 2014/0177731 A1 | 6/2014 | Limberg | |
| 2016/0313923 A1 | 10/2016 | Lai et al. | |
| 2016/0328158 A1 | 11/2016 | Bromberg et al. | |
| 2017/0031606 A1 | 2/2017 | Luan et al. | |
| 2017/0031619 A1 | 2/2017 | Luan et al. | |
| 2017/0031762 A1 | 2/2017 | Luan et al. | |
| 2017/0153824 A1 | 6/2017 | Luan et al. | |
| 2017/0315738 A1 | 11/2017 | Arsovski et al. | |

FOREIGN PATENT DOCUMENTS

| | | |
|---|---|---|
| CN | 101436150 A | 5/2009 |
| CN | 101578614 A | 11/2009 |
| CN | 102460376 A | 5/2012 |
| CN | 103077123 A | 5/2013 |
| EP | 2717186 A1 | 4/2014 |
| EP | 2722764 A1 | 4/2014 |
| WO | 0029959 A1 | 5/2000 |
| WO | 2010151267 A1 | 12/2010 |

OTHER PUBLICATIONS

U.S. Appl. No. 14/810,895, filed Jul. 28, 2015.
U.S. Appl. No. 14/955,966, filed Dec. 1, 2015.
Romanski, H. "Cisco Announces Intent to Acquire Memoir Systems," Cisco Blogs, Sep. 18, 2014, pp. 1-2, retrieved from http://blogs.cisco.com/news/cisco-announces-intent-to-acquire-memoirsystems?_ga=1.212056084.1031501759.1477501413.
International Search Report and Written Opinion from International Application No. PCT/CN2015/098231, dated Aug. 24, 2016.
International Search Report from International Application No. PCT/CN2016/092030, dated Nov. 1, 2016.
International Search Report from International Application No. PCT/CN2016/092028, dated Oct. 31, 2016.
International Search Report from International Application No. PCT/CN2016/091925, dated Sep. 27, 2016.
Non-Final Office Action from U.S. Appl. No. 14/811,763, dated Jan. 20, 2017.
Notice of Allowance from U.S. Appl. No. 14/811,763, dated May 8, 2017.
Non-Final Office Action from U.S. Appl. No. 14/810,895, dated Jan. 12, 2018.

* cited by examiner

DYNAMIC CODING ALGORITHM FOR INTELLIGENT CODED MEMORY SYSTEM

TECHNICAL FIELD

This patent document relates generally to techniques and systems for memory access.

BACKGROUND

Computer systems can include memory such as random access memory (RAM) to execute programs and to facilitate data transfer from and to input/output (I/O) devices. A program can include load and store instructions to read data from memory and to write data to memory. Some systems include a memory controller to handle memory requests from one or more sources such as a central processing unit (CPU), direct memory access (DMA), hardware accelerator (HAC), or digital signal processor (DSP). Some systems include one or more caches in order to speed-up memory access. If a cache does not have the requested data, a system can access data from main memory. Main memory can include multiple banks.

SUMMARY

This document describes, among other things, technologies relating to dynamic coding of memory regions. In one aspect, a described technique includes monitoring accesses to a group of memory regions, each region including two or more portions of a group of data banks; detecting a high-access memory region based on whether accesses to a region of the group of memory regions exceeds a threshold; generating coding values of a coding region corresponding to the high-access memory region, the high-access memory region including data values distributed across the group of banks; and storing the coding values of the coding region in a coding bank.

In another aspect, a system for dynamic coding of memory regions can include a group of data banks including a first data bank and a second data bank; a coding bank; and a memory controller coupled with the data banks and the coding bank. The memory controller can be configured to monitor accesses to a group of memory regions, each region representing a different portion of the data banks, detect a high-access memory region based on whether accesses to a region of the group of memory regions exceeds a threshold, generate coding values of a coding region corresponding to the high-access memory region, the high-access memory region including data values distributed across the data banks, and store the coding values of the coding region in the coding bank.

In another aspect, an apparatus for dynamic coding of memory regions can include an interface to couple with a coding bank and a group of data banks; and a memory controller coupled with the interface. The memory controller can be configured to monitor accesses to a group of memory regions, each region representing a different portion of the data banks, detect a high-access memory region based on whether accesses to a region of the group of memory regions exceeds a threshold, generate coding values of a coding region corresponding to the high-access memory region, the high-access memory region including data values distributed across the group of data banks, and store the coding values of the coding region in the coding bank. The interface can include circuitry to communicate with one or more memory busses. The memory controller can be configured to use the coding bank to increase a number of parallel memory accesses to the high-access memory region that are serviceable in a single cycle from a first number of accesses to a second, greater number of memory accesses.

The details of one or more embodiments of the subject matter described in this document are set forth in the accompanying drawings and the description below. Other features, aspects, and advantages of the subject matter will become apparent from the description, the drawings, and the claims.

DETAILED DESCRIPTION

Computer systems, such as desktop computers, servers, smartphones, tablets, laptops and other devices, can be configured for opportunistic coding of heavily accessed memory regions to increase effective memory bandwidth. Memory, including its constituent data banks, can be divided into different regions, where frequently accessed regions are determined and coded on the fly to enable a coding based alternate access technique. Programs, such as programs executed on multiple cores, can generate heavily localized memory requests. These requests can create memory resource conflicts such as bank conflicts. Once detected, a memory region corresponding to the heavily localized memory requests can be coded and the resulting coding region stored in one or more coding banks. Rather than accessing a data bank specifically for one or more of the memory requests, a coding based alternate access technique can divert some requests from the data banks and service them by accessing one or more coding banks and reconstructing data based on coding values and values obtained from other memory requests.

Particular embodiments of the technology described in this document can be implemented so as to realize one or more of the following advantages. Dynamically coding a portion of memory such as a high access memory region in one or more coding banks can be accomplished with a minimal increase in overall physical memory, e.g., the size of a coding bank can be significantly smaller than the size of a data bank. Bank conflicts can be resolved in the same cycle via the coding banks to increase memory bandwidth. Further, additional requests can be serviced via the coding banks to increase memory bandwidth. Dynamically coding a high frequency access region can reduce or eliminate storing unused coded data.

Figure 1:
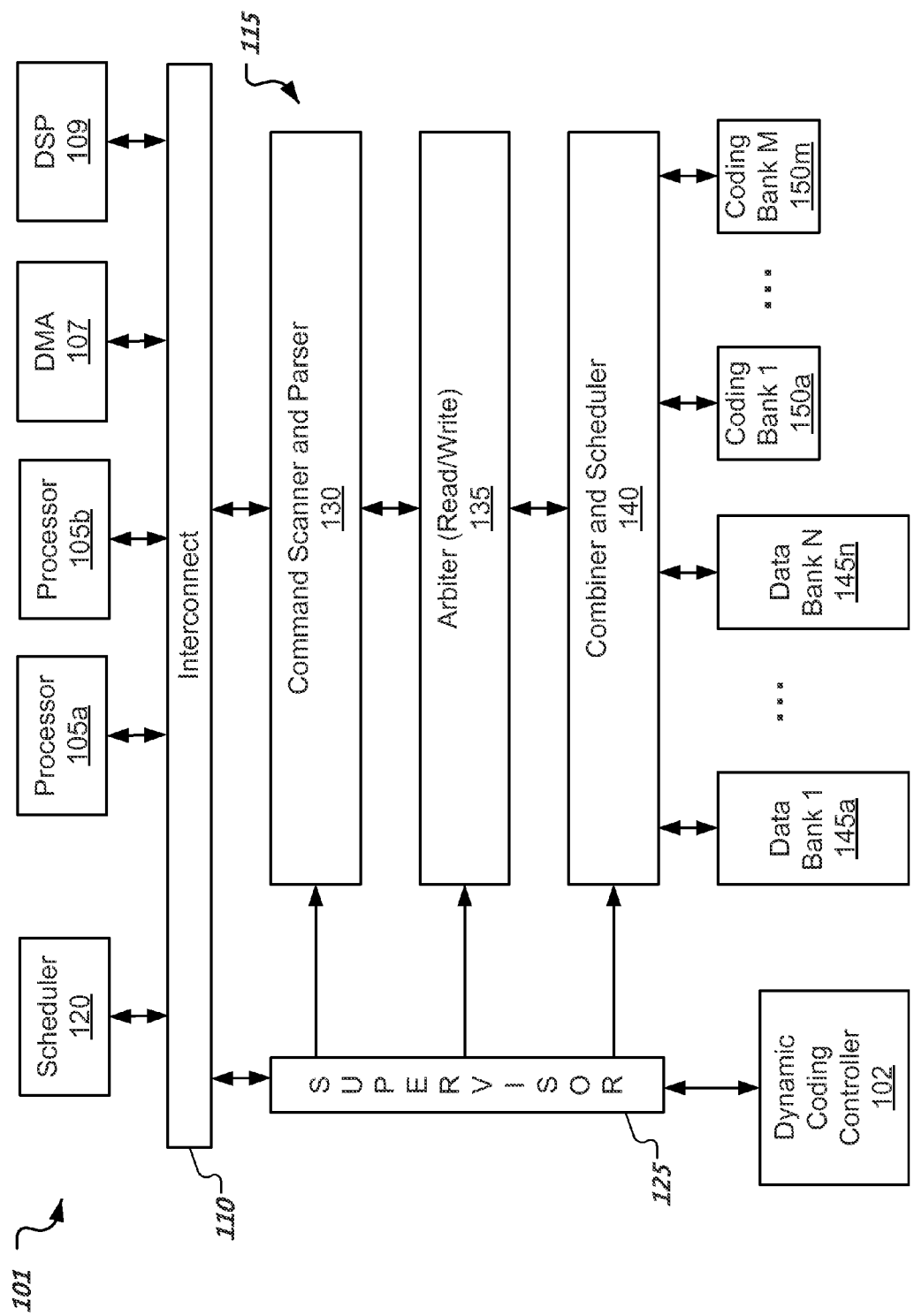
FIG. 1 shows an example architecture of a computer system for dynamic coding.

FIG. 1 shows an example architecture of a computer system 101 for dynamic coding. The computer system 101 can include "memory clients" such as processors 105a-b, direct memory access (DMA) unit 107, and digital signal processor (DSP) 109. Other and different types of memory clients are possible. Such memory clients are coupled with an interconnect 110. The interconnect 110 can be coupled with a shared memory controller 115. The shared memory controller 115 can include a command scanner and parser 130, arbiter 135, and a combiner and scheduler 140. Such memory clients can independently generate memory requests such as read requests or write requests. In this example, the computer system 101 can be configured to handle up to P memory requests in parallel.

Memory requests are funneled through a command scanner and parser 130. After scanning and parsing, an arbiter 135 applies arbitration rules to reduce or minimize conflicts with accessing the data banks 145a-n. An arbitration rule can be based on the physical limitations of the system 101 including the data banks 145a-n. For example, such a rule can specify that a bank can only service a single request per clock cycle. The arbiter 135 can provide low-level services such as queue management and arbitration. In some cases, a memory request can be serviced by accessing one of the data banks 145a-n. In some other cases, a memory request can be serviced by accessing two or more data banks 145a-n. For a read, a combiner and scheduler 140 can be configured to concatenate data from different data banks 145a-n. For a write, the combiner and scheduler 140 can be configured to distribute data to different data banks 145a-n.

In some implementations, a processor 105a can schedule high level memory accesses via a scheduler 120. In some implementations, a component such as the processor 105a or a scheduler 120 can control the various memory subsystem components such as a supervisor 125, dynamic coding controller 102, command scanner and parser 130, arbiter 135, and combiner and scheduler 140. In some implementations, events such as unresolvable memory conflicts and memory read or write errors can be reported to the processor 105a via the supervisor 125. In some implementations, the supervisor 125 can configure the arbiter 135 with one or more arbitration rules.

The computer system 101 can be configured for opportunistic coding of heavily accessed memory regions to increase effective memory bandwidth. Memory can be divided into different regions, where a frequently accessed "hot region" can be determined and coded on the fly by the dynamic coding controller 102. The dynamic coding controller 102 can maintain one or multiple coding regions at a time within the coding banks 150a-m. A coding region can include linear combinations of pairs of values stored in different data banks 145a-n that correspond to the same memory region. A linear combination can be stored as a coding value, e.g., a group of one or more coding bits. If a memory region has a coding region stored within the coding banks 150a-m, a bank conflict among multiple requests can be resolved via modifying one of the requests to use an alternate data bank and the coding region. In some implementations, data obtained to service a request from one data bank can be used to service requests for other data banks data by using one or more coding bits within the coding banks 150a-m. In some implementations, the combiner and scheduler 140 can include coding reconstruction logic to extract data values from coding bits. In some implementations, a coding region can include linear combinations of three or more values stored in different data banks 145a-n that correspond to the same memory region. In some implementations, a coding region can include nonlinear combinations of two or more values stored in different data banks 145a-n that correspond to the same memory region.

Memory clients, which can be referred to as masters, such as processors 105a-b, DMA unit 107, and DSP 109 can communicate with the shared memory controller 115 over the interconnect 110. The interconnect 110 can include technology such as one or more busses, one or more networks such as a packet-switched network, or a combination thereof. In some implementations, the bus width of one or more busses in the interconnect 110 may or may not be the same as other busses. For example, one or more busses in the interconnect 110 can be 128 bits wide, whereas other busses can be 256 bits wide. Further, one master can communicate on a 128 bit wide bus of the interconnect 110, whereas another master can communicate on a 256 bit wide bus of the interconnect 110. In some implementations, the shared memory controller 115 can be directly connected to one or more of the masters, e.g., processors 105a-b, DMA unit 107, or DSP 109. The interconnect 110 can use one or more protocols for transferring data. In some implementations, one or more of the masters can be configured with a point-to-point direct connection to the shared memory controller 115 to achieve high performance.

One or more components within the computer system 101 can be clocked at a common frequency, can be clocked independently, or a combination thereof. In some implementations, components coupled with the interconnect 110 can be clocked synchronously. The clock speeds for memory (e.g., data banks 145a-n and coding banks 150a-m) and the shared memory controller 115 can be proportional to the clock speed for masters coupled with the interconnect 110. In some implementations, components coupled with the interconnect 110 can be clocked asynchronously. Such components can be clocked at different frequencies, and with different clock phases if clocked asynchronously. For example, in some implementations, masters can be clocked at a frequency F, whereas memory (e.g., data banks 145a-n and coding banks 150a-m) and the shared memory controller 115 can be clocked at F/2. It is understood that F can be a number greater than zero, including integer numbers and numbers with a fractional component. Alternatively, in some implementations, shared memory can be clocked at F/2, whereas the shared memory controller 115 can be clocked at F/4. Clock speeds for a particular implementation can be adjusted to meet various performance and power targets. In some implementations, command scanner and parser 130 takes the read and write commands from all masters and places commands into arbiter 135 based on their target addresses.

Figure 2:
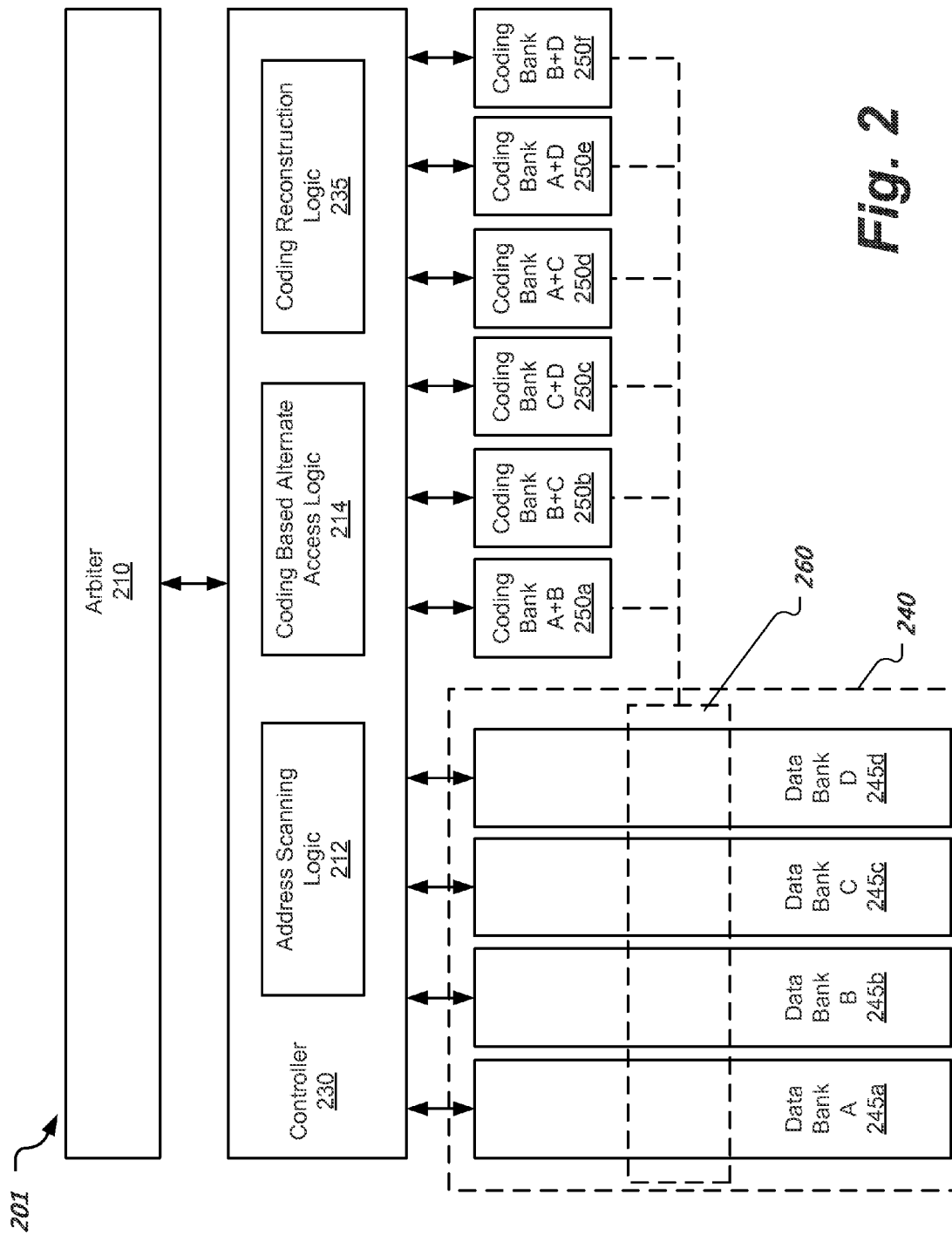
FIG. 2 shows a architecture of an example of a memory subsystem having coding based alternate memory access logic.

FIG. 2 shows an example architecture of a memory subsystem 201 having coding based alternate memory access logic 214. The memory subsystem 201 can control access to a memory 240 that has multiple data banks 245a-d. The memory 240 can be divided into different regions, where each region corresponds to an address range. In this example, regions such as region 260 are stripped across the data banks 245a-d, e.g., region 260 includes a portion of data bank A 245a, a portion of data bank B 245b, a portion of data bank C 245c, and a portion of data bank D 245d. Note that the size of a portion of a data bank is less than the size of the entire data bank. In some implementations, the portions correspond to different address subranges. For example, values corresponding to a consecutive range of memory addresses can be distributed across respective data banks 245a-d in a linear or interleaved format. In some implementations, there can be multiple regions of memory, for which codes can occupy the coding banks. For example, there can be four nonconsecutive memory regions, unequal in size, for which the codes are stored in the coding bank. The size of the codes can be less than or equal to the size of coding banks.

The memory subsystem 201 can support up to P memory accesses, e.g., read accesses, write accesses, or a combination, per memory cycle to the memory 240. P can be an integer greater than zero. In some implementations, P can be increased by adding more banks such as more data banks 245a-d, coding banks 250a-f, or both. In some cases, reaching the maximum number P of memory accesses may require conflict free memory accesses, e.g., the accesses cannot be to the same data bank, or looking ahead to determine whether other memory requests can be satisfied within the same cycle. In some executing environments, accesses to memory can, for a duration of time, be highly localized to a discrete address region. This may cause conflicts if there are physical restrictions on the number of concurrent accesses to a data bank. However, in this example, conflicting memory accesses can be resolved via a coding based alternate memory access technique such that the maximum number P of memory accesses is attainable. Further, the memory subsystem 201 can determine whether other memory requests can be satisfied within the same cycle by using the coding based alternate memory access technique.

The memory subsystem 201 includes coding banks 250a-f that provide a coding region associated with data in a highly accessed, hot region 260 of the data banks 245a-d. Coding values of the coding region can be based on linear combinations of data values of the same row in the data banks 245a-d. The coding region in the coding banks 250a-f enable the coding based alternate memory access technique. Here, a first coding bank 250a provides coding values that cover data values in data bank A 245a and data bank B 245b (e.g., A+B) that belong to the hot region 260, a second coding bank 250b provides coding values that cover data values in data bank B 245b and data bank C 245c (e.g., B+C) that belong to the hot region 260, and so on as depicted. Other mappings between data banks 245a-d and coding values are possible. In some implementations, a set of coding bits is the output of a coding function, such as an exclusive OR (XOR), of data bits within two different data banks 245a-d.

The arbiter 210 can arbitrate traffic to the data banks 245a-d based on memory address. The controller 230 includes address scanning logic 212 to detect conflicts and/or to determine the possibility of servicing additional requests based on a coding based alternate access technique. The coding based alternate access logic 214 can generate modified requests to resolve conflicts or service additional request via the coding banks 250a-f. The coding based alternate access logic 214 can modify a conflicting memory request to a target data bank 245a-b by generating a request to an alternate data bank 245a-d and to a coding bank 250a-f. While one of the conflicting memory requests goes to the target data bank unmodified, the other modified memory request goes to the alternate data bank 245a-d and to the coding bank 250a-f, thereby allowing the requests to be concurrently handled. To return data for the modified request, data values are reconstructed. For example, the controller 230 includes coding reconstruction logic 235 to reconstruct an output for the modified memory request by combining the data from the alternate data bank 245a-d and the coding bank 250a-f.

In this example, the coding banks 250a-f store coding values only for the hot region 260. Thus, in this example, the memory subsystem 201 does not provide coding bits for all of the memory regions. In some implementations, the memory subsystem 201 manages a single hot region 260. The memory subsystem 201, for example, can dynamically switch which region is considered to be the hot region 260. In some implementations, the memory subsystem 201 can detect a hot region 260 of the data banks 245a-d and then generate coding values for storage in the coding banks 250a-f. Based on detecting a change of a hot region 260 to a different region, the memory subsystem 201 can generate coding values for the new region and replace the old values in the coding banks 250a-f with the new values. In some implementations, the memory subsystem 201 manages two or more hot regions 260 and stores coding values for two or more corresponding coding regions in coding banks 250a-f. The size of a coding bank 250a-f can be significantly smaller than the size of a data bank 245a-d. In some implementations, the coding storage capacity is a percentage, e.g., 10%, 15%, or 20%, of data memory capacity; other percentages are possible. In some implementations, the coding banks 250a-f can be of equal sizes. In some implementations, the coding banks 250a-f can be of unequal sizes.

Figure 3:
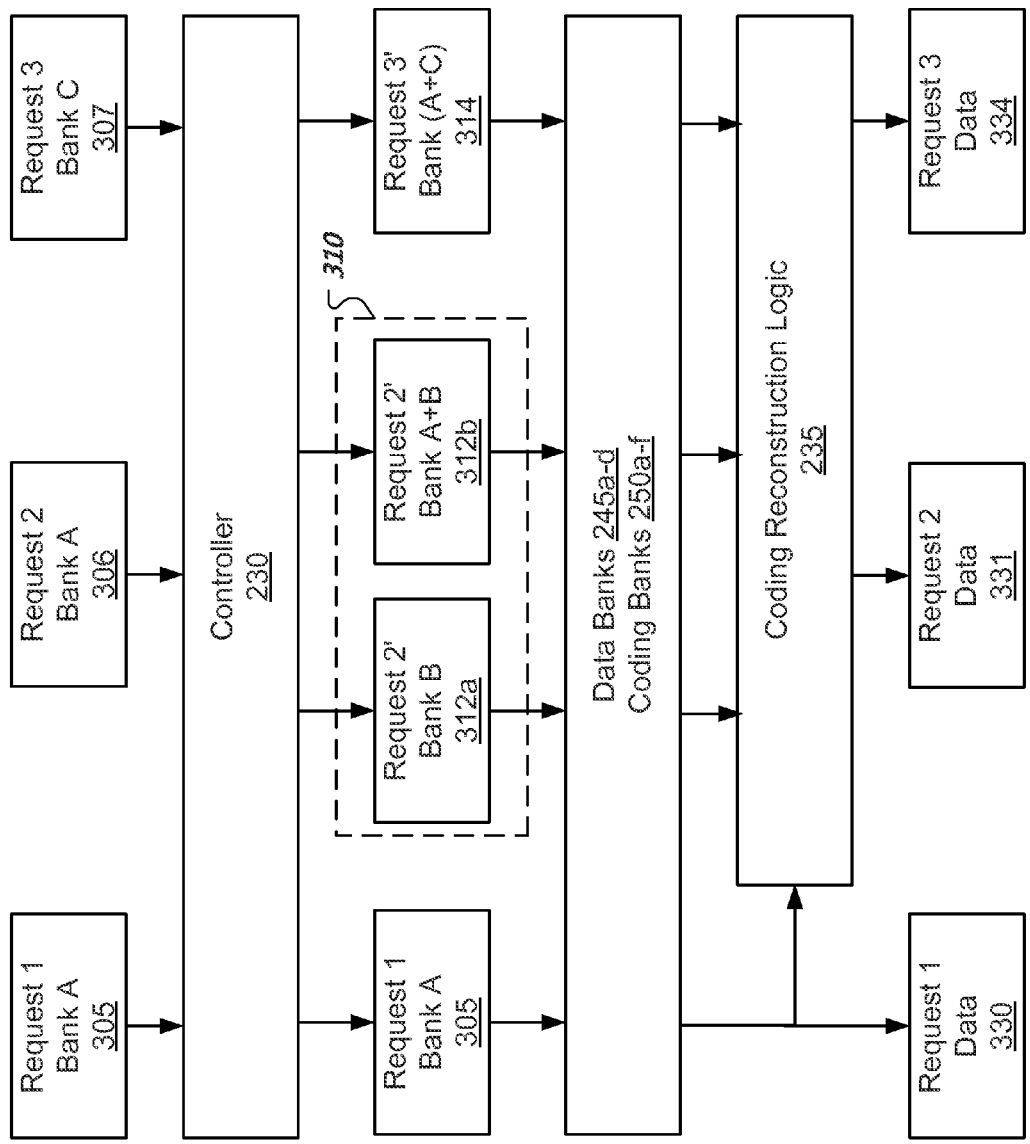
FIG. 3 shows an example of coding based alternate memory based on the memory subsystem of FIG. 2.

FIG. 3 shows an example of coding based alternate memory access based on the memory subsystem 201 of FIG. 2. A controller 230 can receive multiple memory requests 305, 306, 307 from one or more processors. For example, if two memory requests 305, 306 are ready for data bank A 245a, address scanning logic 212 in the controller 230 can detect this conflict. Instead of causing a memory conflict event, coding based alternate access logic 214 in controller 230 can transform one of the memory requests 306 for data bank A 245a into a modified memory request 310 based on a coding configuration. The coding configuration can specify an alternate way of accessing data by using the at least one of the coding banks 250a-f. In this example, the coding configuration can specify that data in data bank A 245a can be reconstructed from accessing data in data bank B 245b and coding bank A+B 250a. In some implementations, the + operator in A+B refers to an XOR. Accordingly, the modified memory request 310 includes a memory request 312a for data bank B 245b and a memory request 312b for coding bank A+B 250a.

Data 330 for the unmodified memory request 305 are returned. However, return data 331 for the second memory request 306 can be reconstructed from data responsive to the modified memory request 310. Coding reconstruction logic 235 in the controller 230 can output data responsive to the modified memory request 310 by reconstructing A data from B data (from data bank 245b) and A+B coding data (from coding bank 250a) to form the return data 331 for the memory request 306.

Further, an additional request 307 can be serviced in parallel with the requests 305, 306. Here, the additional request 307 is for data in data bank C 245c. The coding based alternate access logic 214 in controller 230 can transform the additional request 307 into a modified additional request 314 based on a coding configuration. The coding configuration can specify an alternate way of accessing data by using the at least one of the coding banks 250a-f. In this example, the coding configuration can specify that data in data bank C 245c can be reconstructed from coding bank A+C 250d and the data accessed from data bank A 245a for request 305; this is based on access 305 and access 307 are to the same row in bank A. Coding reconstruction logic 235 can output data responsive to the modified additional request by reconstructing C data from A data (from data bank A 245a) and A+C coding data (from coding bank 250d) to form the return data 334 for the additional request 307. Note that servicing the additional request 307 via a coding bank and not a data bank allows the controller 230 to schedule yet another request for bank C (not shown) in the same cycle as the other requests 305, 306, 307.

Figure 4:
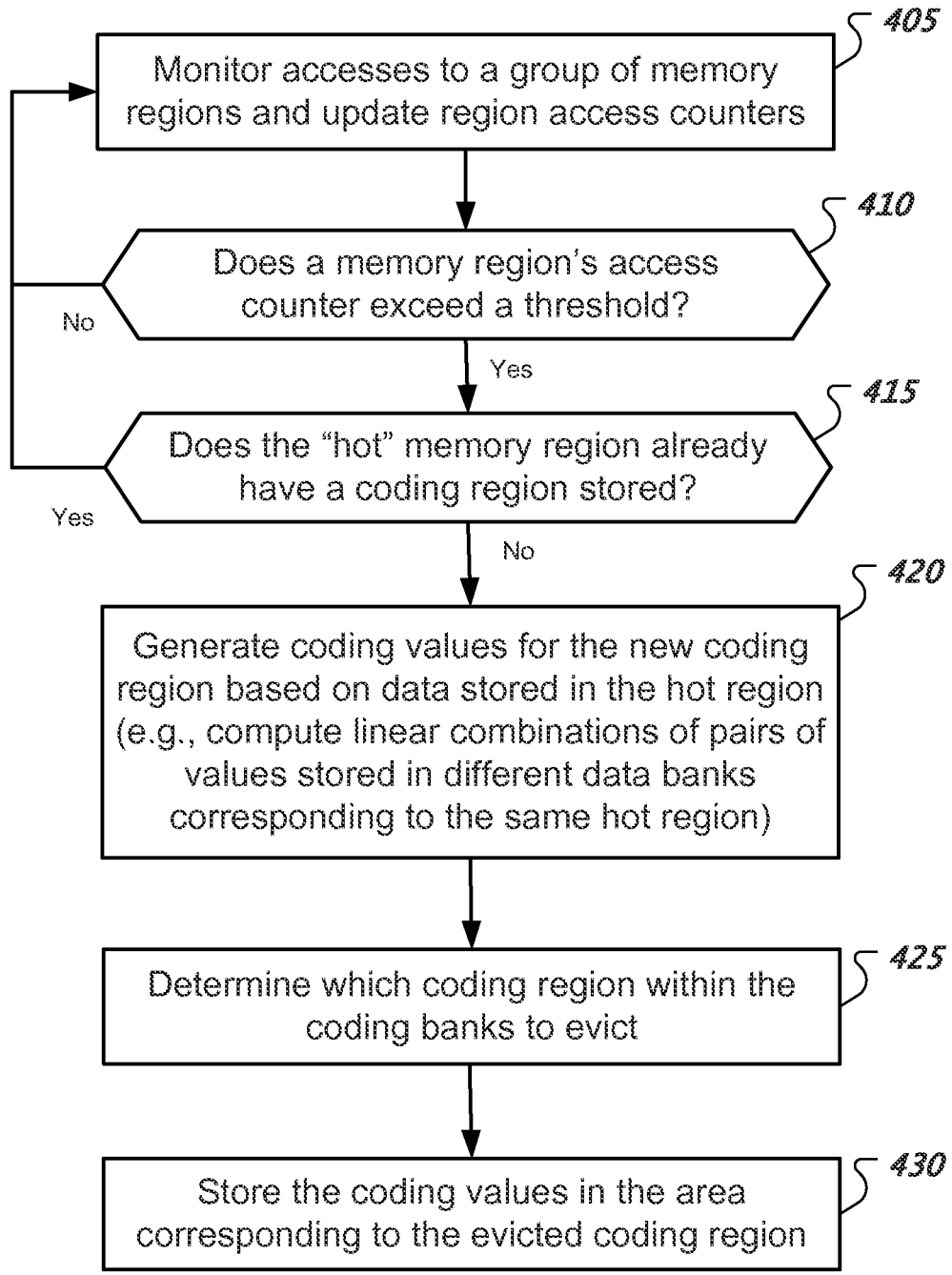
FIG. 4 shows a flowchart of an example of a dynamic coding generation process.

FIG. 4 shows a flowchart of an example of a dynamic coding generation process. At 405, the process can monitor accesses to a group of memory regions and update region access counters. An access to a memory region can increment a counter. The process can maintain tuples of memory regions, e.g., [Start Address, Length], where each region is defined by a start address and a region length or end address. An access to a particular memory region is considered a hit. Each hit can increment an access counter of the corresponding memory region. At 410, the process can determine whether a memory region's access counter exceeds a threshold. If no counters exceed a threshold, the process continues to monitor at 405. If a memory region's access counter exceeds a threshold, the memory region can be referred to as a "hot region." In some implementations, the threshold is programmable. In some implementations, the threshold can be defined in terms of a fraction, e.g. $\frac{1}{16}$, of a size of a memory region. In some implementations, the threshold can be a predetermined number of accesses to a region, e.g., 10 accesses to a region of size 2,048 bytes. At 415, the process can determine whether the hot region already has a coding region stored. If already stored, the process continues to monitor at 405. If not already stored, the process, at 420, can generate coding values for the new coding region based on data stored in the hot region. A coding value can include one or more coding bits. Generating coding values can include computing linear combinations of pairs of values stored in different data banks corresponding to the same hot region. In some implementations, a memory region can include at least one row, e.g., a grouping of two or more sequential memory elements, distributed across two or more data banks In some implementations, a memory region can include two or more rows. Computing linear combinations for a row can include using pairs of values stored in different data banks corresponding to the row to compute coding values such as XOR values.

At 425, the process can determine which coding region within the coding banks to evict, e.g., remove or overwrite. In this example, the coding banks can store coding values for two or more coding regions corresponding to two or more hot memory regions. In some implementations, the process can use a least recently used (LRU) policy or a first in first out (FIFO) policy to determine which coding region to evict. In some implementations, the coding banks store one coding region for one memory region at a time, and accordingly the determination at 425 is not required.

At 430, the process can store the coding values in the area corresponding to the evicted coding region. Storing the coding values can including overwriting data in the evicted coding region. Further, the process can adjust the access counters for the memory regions. In some implementations, the access counters are reset based on the eviction. In some implementations, the access counters are reset based on a new coding region being selected. The process can use the coding bank to increase a number of parallel memory accesses to the high-access memory region that are serviceable in a single cycle from a first number of accesses to a second, greater number of memory accesses.

Figure 5:
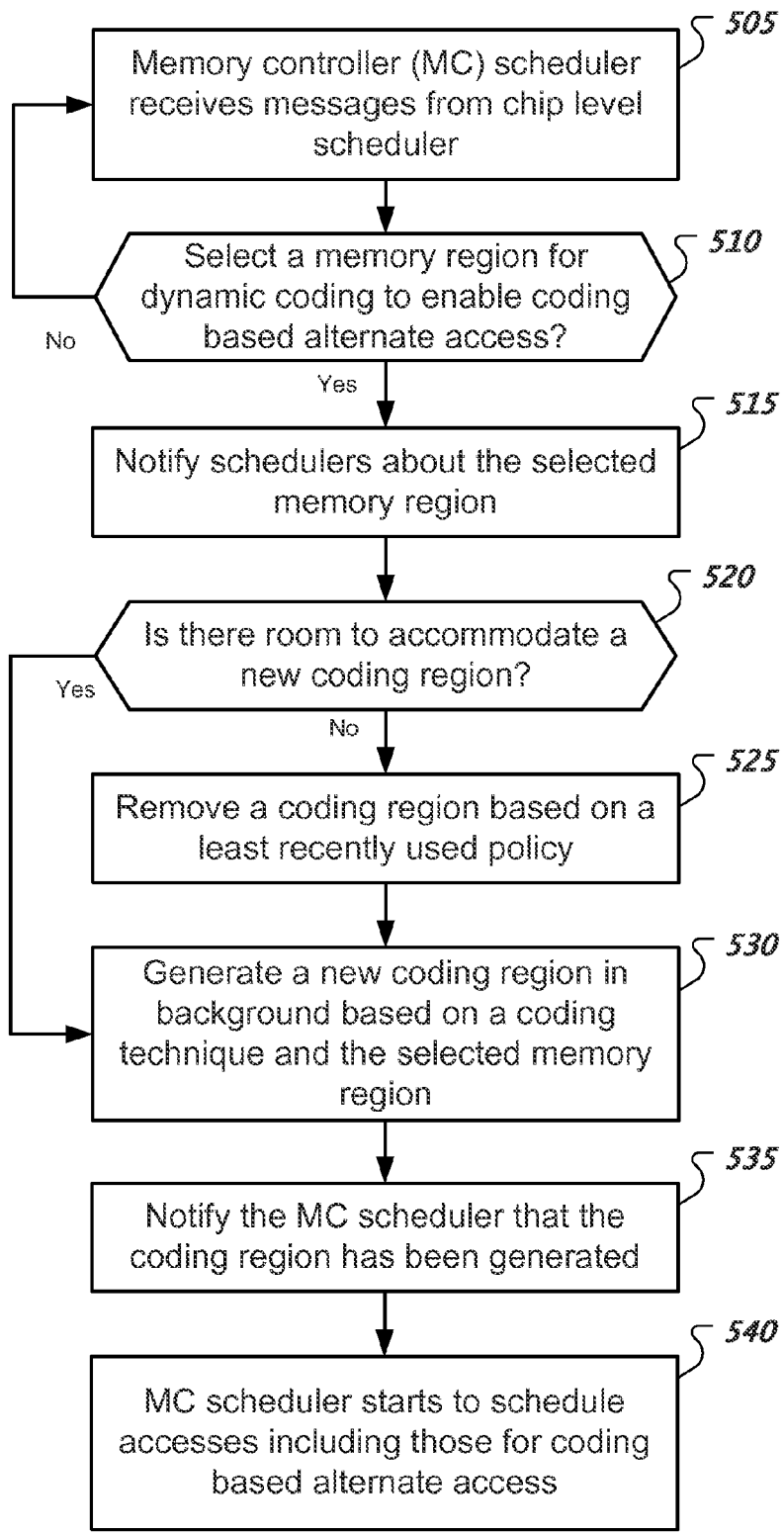
FIG. 5 shows a flowchart of another example of a dynamic coding generation process.

FIG. 5 shows a flowchart of another example of a dynamic coding generation process. A computer system can include schedulers such as a chip level scheduler and a memory controller (MC) scheduler. At 505, the MC scheduler receives messages from a chip level scheduler. At 510, the process determines whether to select a memory region for dynamic coding to enable coding based alternate access. In some implementations, determining whether to select a memory region for dynamic coding can include determining whether a memory region is a high-access memory region in comparison to other memory regions. If no regions are selected, the process continues to receive messages at 505.

If a memory region is selected, at 515, one or more of the schedulers are notified about the selected memory region. At 520, the process determines whether there is room to accommodate a new coding region. Determining whether there is room to accommodate a new coding region can include checking a data structure associated with the coding banks to determine whether there is an unused coding region. If there is no room, then the process, at 525, removes a coding region based on a policy such as LRU or FIFO.

If there was room or after a coding region was removed, the process, at 530, generates a new coding region in the background based on a coding technique and the selected memory region. A coding technique can include generating coding values such as XOR values between different pairs of memory elements, e.g., a byte or a word, that are stored in different data banks. Other types of coding values are possible. At 535, the process notifies the MC scheduler that the coding region has been generated. At 540, the MC scheduler starts to schedule accesses including those for coding based alternate access.

The MC scheduler can start to resolve conflicts to data banks within the selected memory region via coding based alternate access. Further, the MC scheduler can determine if other memory requests can be satisfied via coding based alternate access. For example, the MC scheduler can receive a first memory request to a first data bank of the group of data banks and a second memory request to a second data bank of the group of data banks. The MC scheduler can determine whether the second request is satisfiable based on data produced by the first memory request and a coding value from a coding bank. If it is satisfiable, then the MC scheduler can schedule, in a single cycle, an access for data from first data bank to satisfy the first memory request and an access for data from the coding bank in lieu of the second data bank to satisfy the second memory request.

Figure 6:
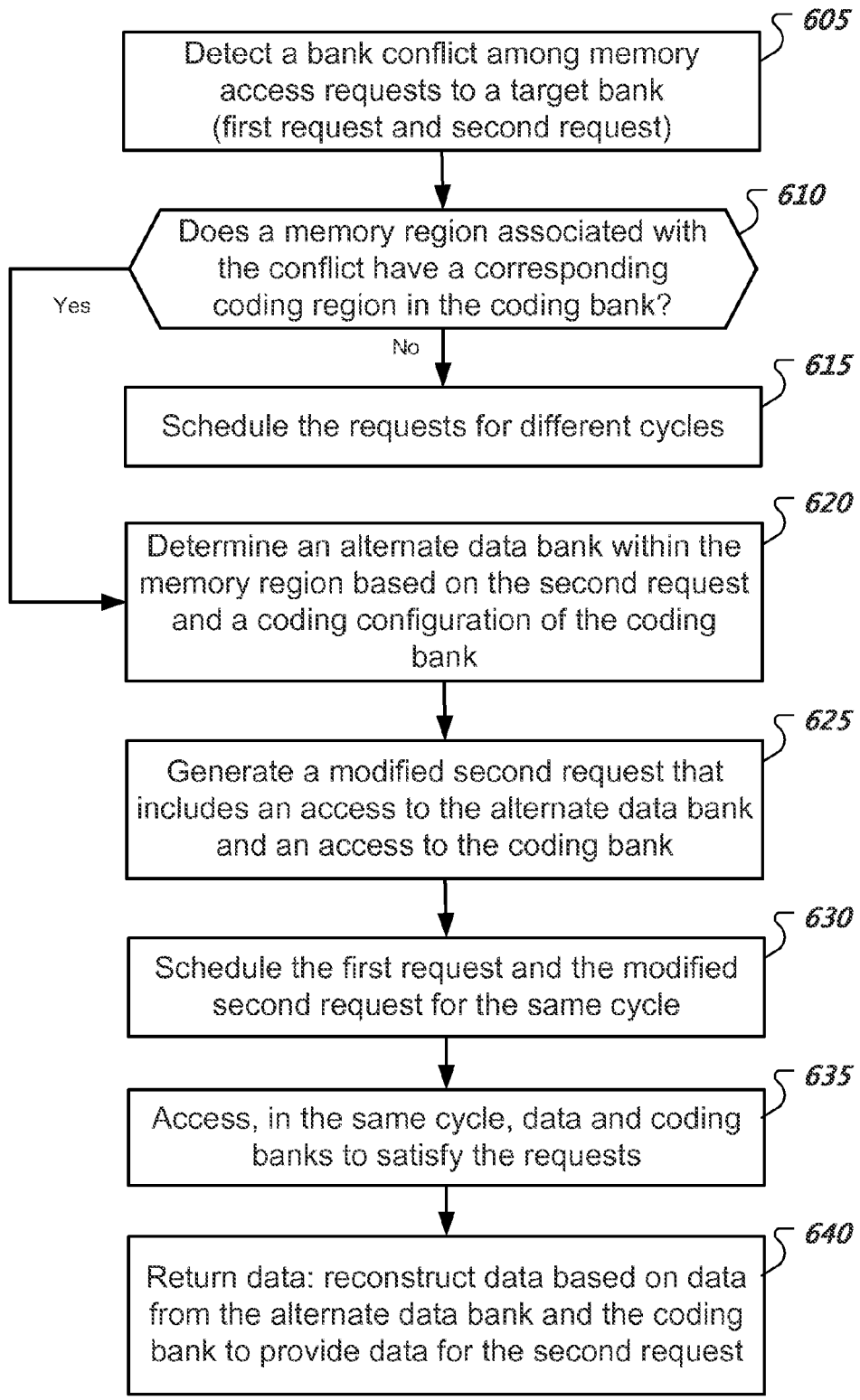
FIG. 6 shows a flowchart of an example of a request conflict resolution and memory access process associated with coding based alternate access.

FIG. 6 shows a flowchart of an example of a request conflict resolution and memory access process associated with coding based alternate access. At 605, the process detects a bank conflict among memory requests, including a first request and a second request, to a target bank. Detecting a conflict can include determining bank identifiers for the requests and whether any of the bank identifiers match. At 610, the process determines whether a memory region associated with the conflict has a corresponding coding region in the coding bank. In some implementations, a memory region identifier is checked against a list of one or more identifiers associated with one or more coding regions stored in a coding bank. If there is not, the process at 615, schedules the requests for different cycles and proceeds nominally. However, if a coding region exists, the process can use a coding based memory access technique to resolve the bank conflict by diverting at least one of the memory requests to an alternate data bank and the coding region. For example, the process, at 620, determines an alternate data bank within the memory region based on the second request and a coding configuration of the coding bank. In some implementations, a coding configuration specifies two or more coding groupings, each coding group covering at least two banks within a group of data banks In some implementations, the coding configuration is represented by a lookup table that outputs an alternate data bank identifier and a coding bank identifier for a given input bank identifier.

At 625, the process generates a modified second request that includes an access to the alternate data bank and an access to the coding bank. At 630, the process schedules the first request and the modified second request for the same cycle. At 635, the process accesses, in the same cycle, memory and coding banks to satisfy the requests. Accessing the memory and coding banks can include accessing the target data bank to satisfy the first request and accessing the alternate data bank and the coding region within the coding bank to satisfy the modified second request. At 640, the process returns data including reconstructed data based on data from the alternate data bank and the coding bank to provide data for the second request.

Figure 7:
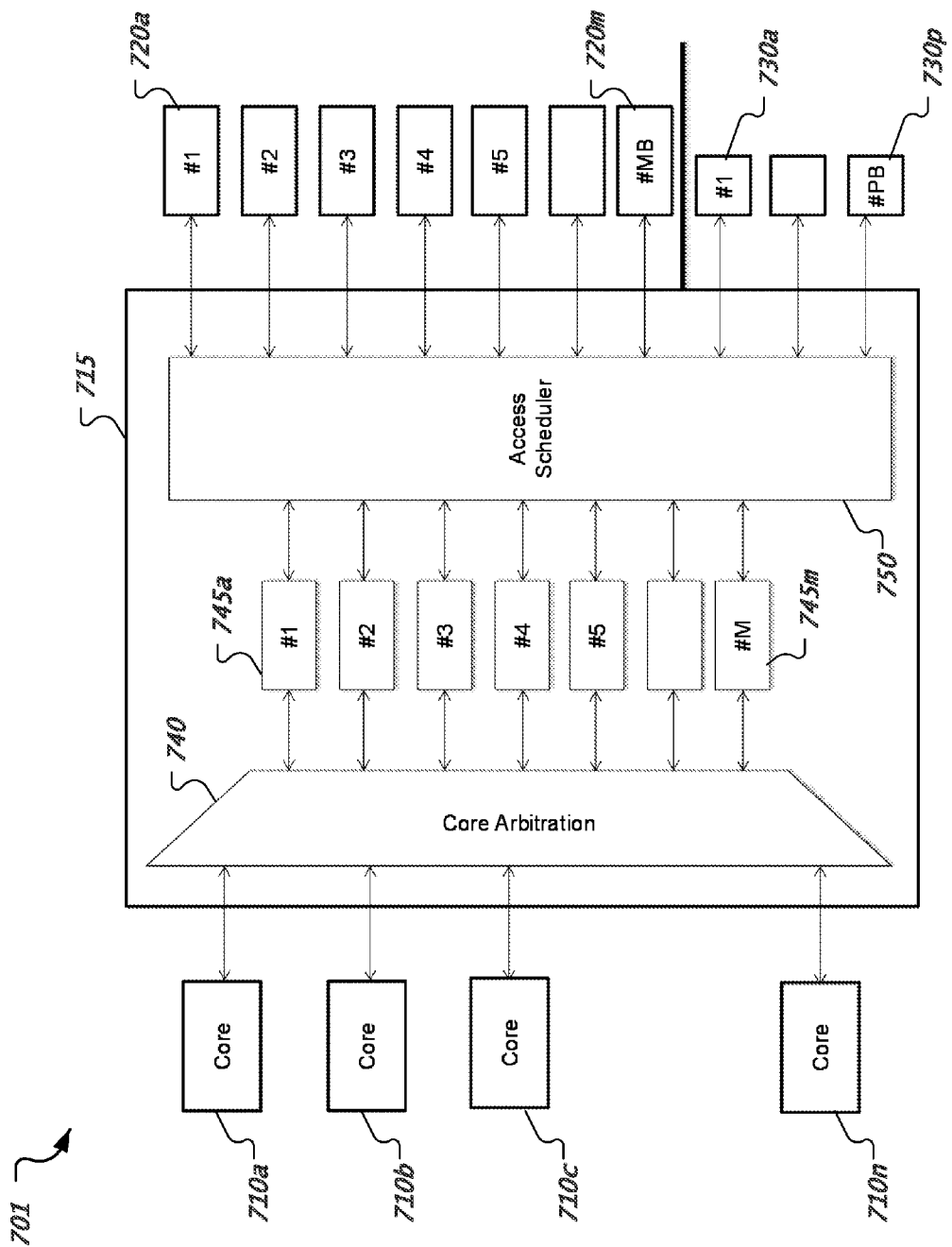
FIG. 7 shows a architecture of another example of a computer system.

FIG. 7 shows another example architecture of a computer system 701. The computer system 701 can include multiple processors such as cores 710$a$-$n$, a coded memory controller 715, data banks 720$a$-$m$, and coding banks 730$a$-$p$. The coded memory controller 715 can include a core arbitrator 740 to arbitrate memory accesses among the cores 710$a$-$m$, data bank queues 745$a$-$m$ for respective data banks 720$a$-$m$ to store requests, and an access scheduler 750 that coordinates accesses among the data banks 720$a$-$m$ and the coding banks 730$a$-$p$. The core arbitrator 740 receives requests from the cores 710$a$-$n$, arbitrates among them, determines the corresponding data banks 720$a$-$m$, and inserts the requests into their corresponding queues 745$a$-$m$.

The access scheduler 750 can schedule access to the data banks 720$a$-$m$ at every cycle. The access scheduler 750 can examine the data bank queues 745$a$-$m$, including read and write queues for each bank, and form an access pattern which is most efficient, e.g., maximizes memory bandwidth, for a given cycle. The access scheduler 750 can prioritize the requests at the bottom of the queue; note that requests are inserted at the top and removed from the bottom. The access scheduler 750 can look ahead in the queues 745$a$-$m$ to determine whether any requests can be serviced by a coding based alternate access technique such that the number of accesses per cycle can be maximized. The access scheduler 750 can use the coding banks 730$a$-$p$ to service reads to other banks 720$a$-$m$. For example, the access scheduler 750 can mark request "a1" to be read from data bank A 720$a$. The scheduler 750 can iterate through queues 745$a$-$m$ of other banks 720$a$-$m$, e.g., banks B, C, and D, to determine if any read requests can be served from one or more of the coding banks 730$a$-$p$ using data from the read of a1. If there is a request for "b1" in bank B, and there is a coding bank containing a linear combination of a1+b1, then the access scheduler 750 can substitute the "b1" request with a "a1+b1" coding bank request and then reconstruct b1 from the "a1+b1" and "a1" values. Likewise, if there is a request for "c1" in bank C, and there is a coding bank containing a linear combination of a1+c1, then the access scheduler 750 can substitute the "c1" request with a "a1+c1" coding bank request and then reconstruct c1 from the "a1+c1" and "a1" values.

One or more techniques for dynamic coding of memory regions can include monitoring accesses to a group of memory regions, each region including two or more portions of a group of data banks; detecting a high-access memory region based on whether accesses to a region of the group of memory regions exceeds a threshold; generating coding values of a coding region corresponding to the high-access memory region, the high-access memory region including data values distributed across the group of banks; and storing the coding values of the coding region in a coding bank. The group of data banks can include a first data bank and a second data bank. The high-access region can include a first portion of the first data bank and a second portion of the second data bank. The coding bank can be smaller than the first data bank. Generating the coding values can include generating pairs of data values, each pair including a data value from the first portion and a data value from the second portion. In some implementations, the coding bank includes two or more coding banks. Techniques can include using the coding bank to increase a number of parallel memory accesses to the high-access memory region that are serviceable in a single cycle from a first number of accesses to a second, greater number of memory accesses. Techniques can include evicting a coding region within the coding bank. Storing the coding values in the coding bank can include storing the storing the coding values in the evicted coding region.

Techniques can include receiving a first memory request to a first data bank of the group of data banks; receiving a second memory request to a second data bank of the group of data banks; determining whether the second request is satisfiable based on data produced by the first memory request and a coding value from the coding bank; and scheduling, in a single cycle, accesses including (i) an access for data from the first data bank to satisfy the first memory request and (ii) an access for data from the coding bank in lieu of the second data bank to satisfy the second memory request. Techniques can include reconstructing data based on the data from the first data bank and the data from the coding bank; and providing the reconstructed data in response to the second memory request.

Techniques can include detecting a bank conflict among memory requests to a first data bank of the group of data banks, the memory requests including a first memory request and a second memory request; determining a second data bank of the group of data banks based on the second memory request and a coding configuration of the coding bank; accessing, in a cycle, the first data bank to satisfy the first memory request; and accessing, in the cycle, the second data bank and the coding bank in lieu of the first data bank to satisfy the second memory request. Techniques can include reconstructing data based on data from the second data bank and the coding bank; and providing the reconstructed data in response to the second memory request. A coding configuration can specify two or more coding groupings, each coding group covering at least two banks within the group of data banks. Techniques can include detecting a bank conflict among a group of memory requests to a first data bank of the group of data banks; determining whether a coding region exists in the coding bank that corresponds to a memory region associated with the bank conflict; and using a coding based alternate memory access technique to resolve the bank conflict by diverting at least one of the memory requests to an alternate data bank and the coding region.

A system can include a group of data banks including a first data bank and a second data bank; a coding bank; and a memory controller coupled with the data banks and the coding bank. The memory controller can be configured to monitor accesses to a group of memory regions, each region representing a different portion of the data banks, detect a high-access memory region based on whether accesses to a region of the group of memory regions exceeds a threshold, generate coding values of a coding region corresponding to the high-access memory region, the high-access memory region including data values distributed across the data banks, and store the coding values of the coding region in the coding bank. The high-access region can include a first portion of the first data bank and a second portion of the second data bank. The coding bank can be smaller than the first data bank. The memory controller can be configured to generate pairs of data values, each pair including a data value from the first portion and a data value from the second portion. A memory controller can include circuitry such as specialized logic, a processor, or both. In some implementations, the coding bank can include two or more coding banks.

In some implementations, the memory controller is configured to use the coding bank to increase a number of parallel memory accesses to the high-access memory region that are serviceable in a single cycle from a first number of accesses to a second, greater number of memory accesses. In some implementations, the memory controller is configured to evict a coding region within the coding bank to produce an evicted coding region, wherein the coding values are stored in the evicted coding region.

In some implementations, the memory controller is configured to receive a first memory request to a first data bank of the group of data banks, receive a second memory request to a second data bank of the group of data banks, determine whether the second request is satisfiable based on data produced by the first memory request and a coding value from the coding bank, and schedule, in a single cycle, accesses including (i) an access for data from the first data bank to satisfy the first memory request and (ii) an access for data from the coding bank in lieu of the second data bank to satisfy the second memory request. In some implementations, the memory controller is configured to reconstruct data based on the data from the first data bank and the data from the coding bank, and provide the reconstructed data in response to the second memory request.

In some implementations, the memory controller is configured to detect a bank conflict among memory requests to a first data bank of the group of data banks, the memory requests including a first memory request and a second memory request, determine a second data bank of the group of data banks based on the second memory request and a coding configuration of the coding bank, access, in a cycle, the first data bank to satisfy the first memory request, and access, in the cycle, the second data bank and the coding bank in lieu of the first data bank to satisfy the second memory request. The memory controller can be configured to reconstruct data based on data from the second data bank and the coding bank, and provide the reconstructed data in response to the second memory request. In some implementations, the memory controller is configured to detect a bank conflict among a group of memory requests to a first data bank of the group of data banks, determine whether a coding region exists in the coding bank that corresponds to a memory region associated with the bank conflict, and use a coding based alternate memory access technique to resolve the bank conflict by diverting at least one of the memory requests to an alternate data bank and the coding region.

An apparatus can include an interface to couple with a coding bank and a group of data banks; and a memory controller coupled with the interface. The memory controller can be configured to monitor accesses to a group of memory regions, each region representing a different portion of the data banks, detect a high-access memory region based on whether accesses to a region of the group of memory regions exceeds a threshold, generate coding values of a coding region corresponding to the high-access memory region, the high-access memory region including data values distributed across the group of data banks, and store the coding values of the coding region in the coding bank. The interface can include circuitry to communicate with one or more memory busses. The memory controller can be configured to use the coding bank to increase a number of parallel memory accesses to the high-access memory region that are serviceable in a single cycle from a first number of accesses to a second, greater number of memory accesses. The memory controller can be configured to receive a first memory request to a first data bank of the group of data banks, receive a second memory request to a second data bank of the group of data banks, determine whether the second request is satisfiable based on data produced by the first memory request and a coding value from the coding bank, schedule, in a single cycle, accesses including (i) an access for data from the first data bank to satisfy the first memory request and (ii) an access for data from the coding bank in lieu of the second data bank to satisfy the second memory request, reconstruct data based on the data from the first data bank and the data from the coding bank, and provide the reconstructed data in response to the second memory request.

While this document contains many specific implementation details, these should not be construed as limitations on the scope of any inventions or of what may be claimed, but rather as descriptions of features specific to particular embodiments of particular inventions. Certain features that are described in this document in the context of separate embodiments also can be implemented in combination in a single embodiment. Conversely, various features that are described in the context of a single embodiment also can be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method comprising:
    monitoring accesses to a group of memory regions, each region comprising two or more portions of a group of data banks;
    detecting a high-access memory region based on whether accesses to a region of the group of memory regions exceeds a threshold;
    in response to the detection of the high-access memory region, generating coding values of a coding region for only the high-access memory region, the high-access memory region comprising data values distributed across the group of data banks;
    storing the coding values of the coding region in a coding bank;
    receiving a first memory request to a first data bank of the group of data banks;
    receiving a second memory request to a second data bank of the group of data banks;
    determining whether the second request is satisfiable based on data produced by the first memory request and a coding value from the coding bank;
    scheduling, in a single cycle, accesses comprising (i) an access for data from the first data bank to satisfy the first memory request and (ii) an access for data from the coding bank in lieu of the second data bank to satisfy the second memory request;
    reconstructing data based on the data from the first data bank and the data from the coding bank; and providing the reconstructed data in response to the second memory request;
wherein the data produced by the first memory request is used for satisfying the first memory request in addition to being also used for satisfying the second memory request.

2. The method of claim 1, wherein the group of data banks comprises a third data bank and a fourth data bank, wherein the high-access region comprises a first portion of the third data bank and a second portion of the fourth data bank, wherein the coding bank is smaller than the third data bank, and wherein generating the coding values comprises generating pairs of data values, each pair comprising a data value from the first portion and a data value from the second portion.

3. The method of claim 1, comprising:
using the coding bank to increase a number of parallel memory accesses to the high-access memory region that are serviceable in a single cycle from a first number of accesses to a second, greater number of memory accesses.

4. The method of claim 1, comprising:
evicting a coding region within the coding bank, wherein storing the coding values in the coding bank comprises storing the coding values in the evicted coding region.

5. The method of claim 1, comprising:
detecting a bank conflict among memory requests to a third data bank of the group of data banks, the memory requests comprising a third memory request and a fourth memory request;
determining a fourth data bank of the group of data banks based on the fourth memory request and a coding configuration of the coding bank;
accessing, in a cycle, the third data bank to satisfy the third memory request;
accessing, in the cycle, the fourth data bank and the coding bank in lieu of the third data bank to satisfy the fourth memory request;
reconstructing data based on data from the fourth data bank and the coding bank; and
providing the reconstructed data in response to the fourth memory request.

6. The method of claim 5, wherein the coding configuration specifies two or more coding groupings, each coding group covering at least two banks within the group of data banks.

7. The method of claim 1, comprising:
detecting a bank conflict among a group of memory requests to a third data bank of the group of data banks;
determining whether a coding region exists in the coding bank that corresponds to a memory region associated with the bank conflict; and
using a coding based alternate memory access technique to resolve the bank conflict by diverting at least one of the memory requests to an alternate data bank and the coding region.

8. A system comprising:
a group of data banks;
a coding bank; and
a memory controller coupled with the group of data banks and the coding bank, wherein the memory controller is configured to:
monitor accesses to a group of memory regions, each region representing a different portion of the data banks,
detect a high-access memory region based on whether accesses to a region of the group of memory regions exceeds a threshold,
in response to the detection of the high-access memory region, generate coding values of a coding region for only the high-access memory region, the high-access memory region comprising data values distributed across the group of data banks,
store the coding values of the coding region in the coding bank,
receive a first memory request to a first data bank of the group of data banks,
receive a second memory request to a second data bank of the group of data banks,
determine whether the second request is satisfiable based on data produced by the first memory request and a coding value from the coding bank,
schedule, in a single cycle, accesses comprising (i) an access for data from the first data bank to satisfy the first memory request and (ii) an access for data from the coding bank in lieu of the second data bank to satisfy the second memory request,
reconstruct data based on the data from the first data bank and the data from the coding bank to produce reconstructed data, and
provide the reconstructed data in response to the second memory request,
wherein the data produced by the first memory request is used for satisfying the first memory request in addition to being also used for satisfying the second memory request.

9. The system of claim 8, wherein the group of data banks comprises a third data bank and a fourth data bank, wherein the high-access region comprises a first portion of the third data bank and a second portion of the fourth data bank, wherein the coding bank is smaller than the third data bank, and wherein the memory controller is configured to generate pairs of data values, each pair comprising a data value from the first portion and a data value from the second portion.

10. The system of claim 8, wherein the memory controller is configured to use the coding bank to increase a number of parallel memory accesses to the high-access memory region that are serviceable in a single cycle from a first number of accesses to a second, greater number of memory accesses.

11. The system of claim 8, wherein the memory controller is configured to evict a coding region within the coding bank to produce an evicted coding region, wherein the coding values are stored in the evicted coding region.

12. The system of claim 8, wherein the memory controller is configured to
detect a bank conflict among memory requests to a third data bank of the group of data banks, the memory requests comprising a third memory request and a fourth memory request,
determine a fourth data bank of the group of data banks based on the fourth memory request and a coding configuration of the coding bank,
access, in a cycle, the third data bank to satisfy the third memory request,
access, in the cycle, the fourth data bank and the coding bank in lieu of the third data bank to satisfy the fourth memory request,
reconstruct data based on data from the fourth data bank and the coding bank to produce reconstructed data, and
provide the reconstructed data in response to the fourth memory request.

13. The system of claim 8, wherein the memory controller is configured to
- detect a bank conflict among a group of memory requests to a third data bank of the group of data banks;
- determine whether a coding region exists in the coding bank that corresponds to a memory region associated with the bank conflict; and
- use a coding based alternate memory access technique to resolve the bank conflict by diverting at least one of the memory requests to an alternate data bank and the coding region.

14. The system of claim 8, wherein the coding bank comprises two or more coding banks.

15. An apparatus comprising:
- an interface to couple with a coding bank and a group of data banks; and
- a memory controller coupled with the interface, wherein the memory controller is configured to:
- monitor accesses to a group of memory regions, each region representing a different portion of the data banks,
- detect a high-access memory region based on whether accesses to a region of the group of memory regions exceeds a threshold,
- in response to the detection of the high-access memory region, generate coding values of a coding region for only the high-access memory region, the high-access memory region comprising data values distributed across the group of data banks,
- store the coding values of the coding region in the coding bank,
- receive a first memory request to a first data bank of the group of data banks,
- receive a second memory request to a second data bank of the group of data banks,
- determine whether the second request is satisfiable based on data produced by the first memory request and a coding value from the coding bank,
- schedule, in a single cycle, accesses comprising (i) an access for data from the first data bank to satisfy the first memory request and (ii) an access for data from the coding bank in lieu of the second data bank to satisfy the second memory request,
- reconstruct data based on the data from the first data bank and the data from the coding bank to produce reconstructed data, and
- provide the reconstructed data in response to the second memory request,
- wherein the data produced by the first memory request is used for satisfying the first memory request in addition to being also used for satisfying the second memory request;
- wherein the memory controller is configured to use the coding bank to increase a number of parallel memory accesses to the high-access memory region that are serviceable in a single cycle from a first number of accesses to a second, greater number of memory accesses.

16. The method of claim 1, comprising:
- dynamically switching which of the memory regions is the high-access memory region; and
- in response to the dynamic switching, generating different coding values of the coding region.

17. The method of claim 1, wherein a plurality of the high-access memory regions is detected, and the coding values of the plurality of the high-access memory regions are stored in a plurality of the coding banks.

18. The method of claim 17, comprising:
- dynamically switching which of the memory regions is at least one of the plurality of the high-access memory regions; and
- in response to the dynamic switching, generating the coding values for a new coding bank.

19. The method of claim 17, comprising:
- dynamically switching which of the memory regions is at least one of the plurality of the high-access memory regions; and
- in response to the dynamic switching, evicting at least one of the plurality of coding banks.

20. The method of claim 19, comprising:
- in response to the dynamic switching, resetting an access counter in connection with the at least one evicted coding bank.

21. The system of claim 8, wherein the memory controller is configured to:
- dynamically switch which of the memory regions is the high-access memory region; and
- in response to the dynamic switching, generate different coding values of the coding region.

22. The system of claim 8, wherein a plurality of the high-access memory regions is detected, and the coding values of the plurality of the high-access memory regions are stored in a plurality of the coding banks.

23. The system of claim 22, wherein the memory controller is configured to:
- dynamically switch which of the memory regions is at least one of the plurality of the high-access memory regions; and
- in response to the dynamic switching, generate the coding values for a new coding bank.

24. The system of claim 22, wherein the memory controller is configured to:
- dynamically switch which of the memory regions is at least one of the plurality of the high-access memory regions; and
- in response to the dynamic switching, evict at least one of the plurality of coding banks.

25. The system of claim 24, wherein the memory controller is configured to:
- in response to the dynamic switching, reset an access counter in connection with the at least one evicted coding bank.

* * * * *